(12) United States Patent
Uke et al.

(10) Patent No.: US 7,188,969 B2
(45) Date of Patent: *Mar. 13, 2007

(54) EMERGENCY FLASHLIGHT

(76) Inventors: Alan K. Uke, 355 14th St., Del Mar, CA (US) 92014; Jeffery D. Arnett, 2702 S. Elm St., Gilbert, AZ (US) 85296

( * ) Notice: Subject to any disclaimer, the term of this patent is extended or adjusted under 35 U.S.C. 154(b) by 165 days.

This patent is subject to a terminal disclaimer.

(21) Appl. No.: 10/678,037

(22) Filed: Sep. 30, 2003

(65) Prior Publication Data

US 2005/0068767 A1 Mar. 31, 2005

(51) Int. Cl.
*F21L 4/00* (2006.01)
(52) U.S. Cl. .............. 362/208; 362/197; 362/198; 362/199
(58) Field of Classification Search ......... 362/157–208
See application file for complete search history.

(56) References Cited

U.S. PATENT DOCUMENTS

| | | |
|---|---|---|
| 4,533,982 A | 8/1985 | Kozar |
| 4,985,812 A | 1/1991 | Uke |
| 5,161,095 A | 11/1992 | Gammache |
| 5,278,739 A | 1/1994 | Gammache |
| 5,410,457 A | 4/1995 | Parker |
| 5,605,394 A | 2/1997 | Chen |
| D406,372 S | 3/1999 | Matthes et al. |
| 5,904,414 A | 5/1999 | Monteleone |
| 5,993,022 A | 11/1999 | Neyer et al. |
| 6,012,824 A * | 1/2000 | Sharrah et al. ............. 362/199 |
| D427,346 S | 6/2000 | Schoen |
| 6,283,610 B1 * | 9/2001 | Alajajian ................... 362/199 |
| 6,457,841 B1 | 10/2002 | Lynch et al. |
| 6,955,446 B2 * | 10/2005 | Uke ........................... 362/208 |

* cited by examiner

*Primary Examiner*—Sandra O'Shea
*Assistant Examiner*—James W Cranson, Jr.
(74) *Attorney, Agent, or Firm*—Foley & Lardner, LLP

(57) ABSTRACT

A battery powered flashlight is described that has a rotatable head that bears the light source assembly. The flashlight can have side-by-side batteries, and can be configured to also include a glass breaker, and a seat belt cutter.

60 Claims, 6 Drawing Sheets

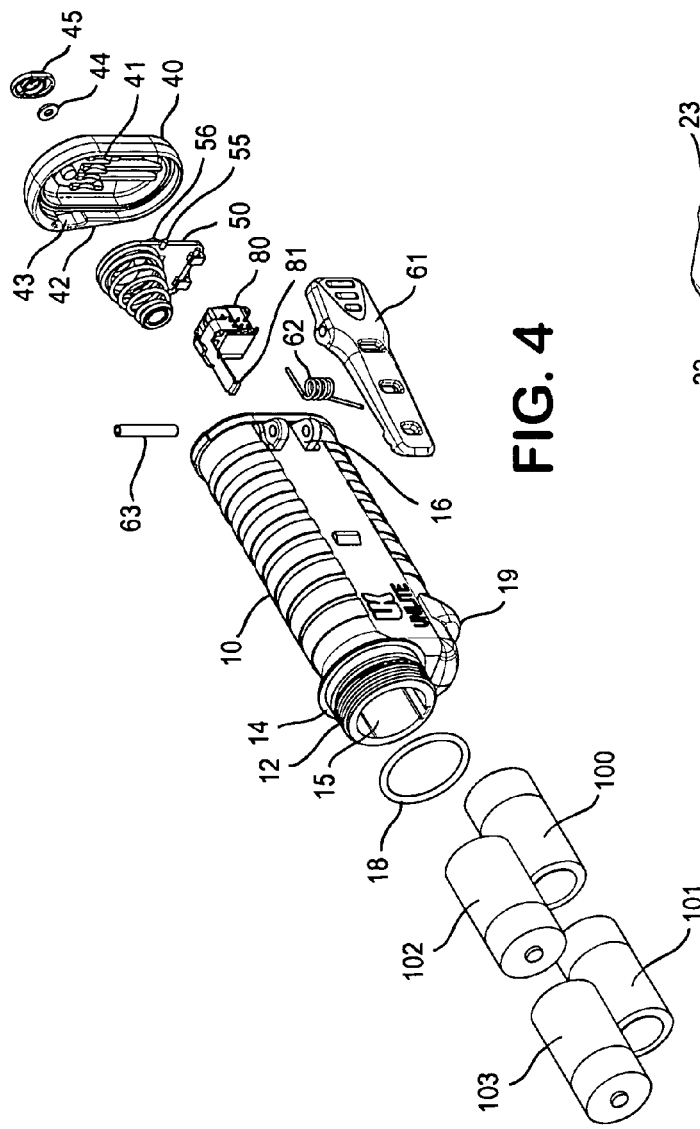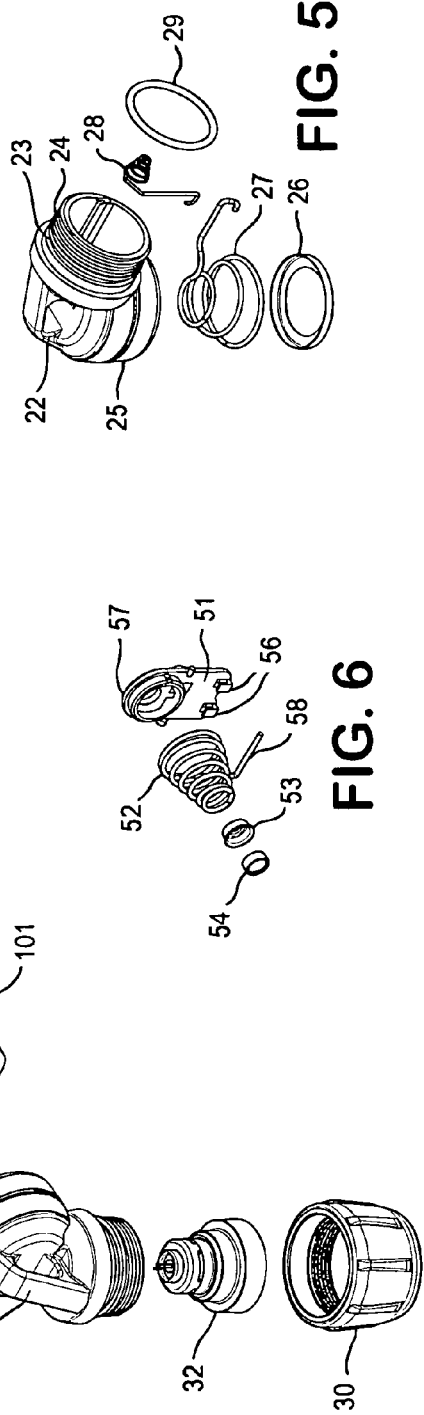

EMERGENCY FLASHLIGHT

CROSS-REFERENCE TO RELATED PATENT APPLICATIONS

Not applicable.

BACKGROUND OF THE INVENTION

The present invention relates to the field of battery powered flashlights, and especially to flashlights suitable for use by emergency workers.

The information provided herein and references cited is intended solely to assist the understanding of the reader. None of the information provided or references cited is admitted to be prior art to the present invention.

A large number of different flashlight designs have been described with various configurations. Most flashlights have generally cylindrical hollow housings that contain one or more cylindrical batteries in a single row. When a plurality of batteries are used, the positive terminal of the battery most distal from the light source contact the negative terminal of the adjacent battery, continuing in this manner so that the positive terminal of the battery nearest the light bulb connects with the bulb. However, not all flashlights use the linear battery arrangement.

Monteleone et al., U.S. Pat. No. 5,904,414 describes a flashlight with a gas permeable membrane and battery polarization. One of the flashlights described has a side-by-side battery configuration with 2 batteries in each row, and uses a connector plate with springs behind it at the rear of the flashlight to electrically connect the two rows of batteries.

Underwater Kinetics markets a flashlight (UK2AAA) that has two AAA batteries in a side-by-side configuration. A contact plate that pivots on a central lateral pin at the back of the flashlight provides contact between the batteries. A screw-on bezel causes the electrical circuit to be completed when the bezel is screwed onto the battery case.

Neyer et al., U.S. Pat. No. 5,993,022 describes a flashlight that has a center pivot mechanical connection between a plastic battery housing and a rotatable plastic turret, said to permit free rotation of the turret.

Lynch, U.S. Pat. No. 6,457,841 describes a flashlight that has a head that pivots between two arms that extend from the housing.

Alajajian, U.S. Pat. No. 6,283,610 describes a flashlight with a rotatable head. The flashlight includes a base that includes a power source, a neck removably attached to the base, and a head rotatably attached to the neck. An illustrated flashlight has a head that rotates about an inclined axis.

Gammache, U.S. Pat. No. 5,161,095 shows a flashlight in which a swivel head rotates about an inclined axis.

Kozar, U.S. Pat. No. 4,533,982 describes a flashlight with a swiveling head connected to the battery casing with a ball-and-socket joint.

Uke, U.S. Pat. No. 4,985,812 describes a waterproof flashlight that has two parallel adjacent rows of batteries.

SUMMARY OF THE INVENTION

The present invention concerns a flashlight that includes a rotating head containing the light source assembly that is directed at approximately right angles to the long axis of the battery case and/or a glass breaker that more efficiently transfers kinetic energy to the impact point. In some embodiments, the flashlight uses batteries in a side-by-side arrangement such that the case is flattened and relatively stable when placed on its back. The inclusion of the glass breaker is particularly advantageous for adapting the flashlight to emergency use, with the glass-breaker located at the rear of the battery case. Also advantageous for emergency use is a cutting blade, e.g., located in a clip. Such a clip is generally hinged or otherwise attached to the battery case, such that the flashlight can be clipped or hung, e.g., on a person's chest or belt, and the light will be away from the person's face. Also adapting the flashlight for emergency use, the flashlight is preferably configured to tolerate impacts, e.g., certified as passing the UL 30 ft drop test. In addition, the flashlight can be configured such that battery connection is polarized, i.e., an electrical circuit cannot be completed unless the batteries are inserted with correct orientation. Thus, the present invention provides a flashlight that can be advantageously configured for many emergency uses, but which is also useful for more general applications.

Thus, in a first aspect, the invention provides a flashlight that includes a battery housing having a front end and a rear end. The flashlight also includes a rotatable head (rotatable with respect to the battery housing) attached at the front end of the flashlight, where the rotatable head bears a light source assembly oriented at an angle of 90±60 (in particular embodiments 90±30, 90±20, 90±10, or 90±5) degrees to the long axis of the battery housing, where the rotatable head is rotatable about that long axis, and is replaceably removable. As usual, the flashlight also includes electrical connections for providing electrical power from the batteries to a light source in the light source assembly.

In particular embodiments, the housing is generally cylindrical, or the housing has a flattened cross-section and is configured to accept a plurality of batteries in a side-by-side configuration such that there are adjacent first and second rows of batteries; removal of the rotatable head allows insertion of batteries through an opening in the battery housing where the rotatable head attaches.

In a related aspect, the invention concerns a flashlight that includes a battery housing that has a front end and a rear end and an illumination head attached at the front end, where the head typically includes a bezel and a light source assembly that can be electrically connected to the batteries; electrical connections for providing electrical power from the batteries to a light source in the light source assembly, and a glass breaker that includes a hard material insert that has at least one vertex or point, where a vertex of the insert protrudes transversely from the flashlight. An example of such an insert is a polygonal (e.g., triangular, rectangular, or pentangular) piece of a materials sufficiently hard to indent glass when struck against it, e.g., hardened metal such as hardened steel, carbide, or ceramic.

In particular embodiments, the housing is generally cylindrical, or the housing has a flattened cross-section and is configured to accept a plurality of batteries in a side-by-side configuration where there are adjacent first and second rows of batteries parallel to the long axis of the housing; the flashlight includes a rotatable angled head as described herein.

In another related aspect, the invention concerns a flashlight that includes a battery housing that has a front and a rear end and that is configured to accept a plurality of batteries in a side-by-side configuration such that there are adjacent first and second rows of batteries. The flashlight also has a rotatable head that includes a light source assembly that can be electrically connected to the batteries, where the light source assembly is oriented at an angle to the long axis of the battery housing, e.g., 30–120 degrees, 60–110 degrees, 90±30, 90±20, 90±10, or 90±5 degrees to the long axis of the battery housing. In many cases the light source assembly is held in place with a bezel. The flashlight also includes electrical connections for providing electrical power from the batteries to a light source in the light source assembly.

In particular embodiments, the head is free of protrusions; the battery housing is openable at the rear end for battery insertion; the rotatable head is removable for battery insertion.

In another related aspect, the invention provides a flashlight with additional particular features. Like the flashlights above, the flashlight includes a battery housing that has a front end and a rear end, where the housing has a flattened cross-section defining a front side and a back side and is configured to accept a plurality of batteries in a side-by-side configuration forming adjacent first and second rows of batteries. The flashlight includes a rotatable head that has a circular housing connection that attaches to the housing at the front end. The rotatable head bears a light source assembly oriented an angle of 30–120 degrees, 60–110 degrees, 90±60, 90±45, 90±30, 90±20, 90±10, or 90±5 degrees to the long axis of the battery housing, the rotatable head is rotatable about the long axis or the housing, and the rotatable head is free of protrusions. As above, the flashlight has electrical connections for providing electrical power from the batteries to a light source in the light source assembly. Typically the housing has an opening at the front end where the rotatable head or bezel is attached; that opening is, in many cases, used for battery insertion.

Unless expressly limited (e.g., expressly limited in an aspect or embodiment described above), the housings of the present flashlights can be shaped in various ways, e.g., generally cylindrical, triangular, have an oval or flattened cross-section, or other desired shape. Unless specifically indicated to the contrary, in the present flashlights, an angled head can be replaced with a straight head. In particular embodiments, for example, for an angled head that includes a knuckle (angled portion) and a bezel retaining a light source assembly, the bezel and light source assembly can be fastened directly to the battery housing, thereby providing a flashlight with a straight head. In other embodiments, a straight head differs from the bezel attached to the knuckle, e.g., a different diameter attachment portion, such that the angled head with its light source can be removed and replaced with a straight head.

In certain embodiments, a flashlight of the present invention also includes a pivot contact at the inside rear end providing an electrical connection between a battery in the first row to a battery in the second row; a pivot connector includes a support with an off-center pivot and a conductive material configured to provide an electrical path between the adjacent rows of batteries; the pivot connector has a coil spring aligned with the second row of batteries oriented toward the front end; the pivot contact has a short side (or arm) oriented for contact with the second row of batteries; the pivot contact has a curved pivot on the back of the pivot support; a curved pivot on the back of the pivot support fits in a concave curved receptacle in the inside rear end of the flashlight body or housing; an arm of the pivot contact presses against the inside of the rear end of the housing when the flashlight is closed with batteries in place; the pivot contact has a front side and a back side with a coil spring on one arm of the front side, and the back side includes a curved pivot surface and a surface that rests against an inner surface at the rear end when the second row of batteries is compressed against the spring; the pivot contact includes battery polarization components; battery polarization components on a pivot contact include a conductive eyelet with a non-conductive plug in the center of the eyelet; battery polarization components include at least one non-conductive protrusion from the front face of the pivot contact support and a conductive material recessed relative to the non-conductive protrusion such that the conductive material will contact the positive terminal of a conventional cylindrical battery and will not contact the negative terminal of such battery; the flashlight also includes a battery polarizer, such that only if the batteries are inserted with correct polarization will an electrical circuit be established to energize the light source; a battery polarizer includes a conductive ring attached to a spring on a pivot contact, providing contact with the negative terminal of an adjacent battery, and a plug in the interior of the ring that prevents electrical contact with the positive terminal of an adjacent battery; the flashlight also includes a gas vent allowing venting of gases from inside the housing; the gas vent includes a gas permeable, water impermeable membrane; the flashlight is adapted for use in hazardous environments; the flashlight is waterproof, the flashlight passes the UL 30 foot drop test; the flashlight is UL Class I, Div I certified.

Further, in particular embodiments, the head is threaded to the housing at a housing connection; threading the head on the housing with a full set of batteries in the housing establishes electrical contact at a pivot contact at the inside rear end of the housing or body; the housing is configured to accept 4 cylindrical batteries with two batteries in each of the rows; the housing is configured to accept 3 cylindrical batteries with two batteries in one row and one battery in the other row; the housing is configured to accept two cylindrical batteries with one battery in each of two rows; in a particular configuration the batteries are AAA, AA, C, or D cell batteries;

Also, in particular embodiments, the flashlight includes a glass breaker; a glass breaker is attached at the rear end of the housing or body; a glass breaker is attached at the flashlight head, e.g., a rotatable head; a glass breaker includes a flat hard material insert (e.g., hard metal such as hardened steel, carbide, or ceramic), such as a polygonal plate such as triangle, rectangle, or pentangle configured such that a side or sides of the polygon bears against the housing (or body or head), e.g., an end cap forming the rear end of the flashlight body or the rotatable head) and the vertex opposite that side or sides extends transversely from the housing or head sufficiently to enable the vertex to contact a glass surface; a glass breaker (e.g., a triangular glass breaker) is oriented at an angle of 45–90, 55–85, 65–80, 60–70, 65–75, 70–80, 70–85, or 75–85 degrees to the longitudinal axis of the housing; a triangular glass breaker is constructed of a hardened metal such as hardened steel, a hard metal carbide (usually tungsten carbide, but others are also available, such as titanium carbide), or a ceramic; a triangular or rectangular glass breaker is a carbide machine tool insert; a triangular glass breaker provides 6 impact points; a rectangular glass breaker provides 8 impact points; a glass breaker includes an impact point and a surface or surfaces distal from that point bearing against the housing (or head) for coupling kinetic energy between the housing (or head) and that impact point, wherein the area of the surface is at least 6, 8, 10, 12, 14, or 16 mm$^2$ or even greater; the housing, head, or body includes a flattened transverse bearing surface on the back side at the rear end, such that the bearing surface stabilizes the flashlight when the flashlight is laid on its back on a level surface; the clip includes at least one protrusion creating a bearing point(s) that stabilizes the flashlight against rolling when the flashlight is placed on its back; the clip is a slip-on clip; the flashlight includes a lanyard hole, e.g., in the knuckle, at the front end of the battery housing, at the rear end of the battery housing.

Still further, in particular embodiments, the flashlight includes a clip attached on the front side of the flashlight; the clip is attached at the rear end; the clip includes a seat belt cutter; a seat belt cutter includes a multi-edge blade; the seat belt cutter includes a shield inhibiting contact of objects thicker than 2, 3, 4, or 5 mm with the blade in the cutter; the clip is a slip-on clip that sufficiently encircles the body of the flashlight to hold itself in place; a slip-on clip is configured such that when installed on a flashlight at least one protrusion on the clip generally on the opposite side of the flashlight from the clip arm acts to create two bearing points or surfaces (e.g., a protrusion on the clip and a point on the housing) such that the flashlight is inhibited from rolling when it is placed on the side opposite the clip arm; a slip-on clip is configured such that when installed on a flashlight the clip arm acts to create two bearing points or surfaces such that the flashlight is inhibited from rolling when it is placed on the side having the clip arm.

In accordance with aspects described herein concerning flashlights with a rotatable angled head, in a related aspect the invention provides a rotatable angled flashlight head that includes a body that has a first end adapted for replaceable attachment to a flashlight battery housing, and a second end adapted for holding a light source assembly, where a central axis passing through the first end makes an angle of 90±60, 90±45, 90±30, 90±20, 90±10, or 90±5 degrees with a central axis passing through the second end, and electrical connections within the body configured to electrically connect batteries in the battery housing with a light source in the light source assembly. When the angled head is installed on a battery housing, the head is rotatable (relative to the battery housing) about the central axis passing through the first end.

In particular embodiments, the angled head is as described herein, e.g., for flashlight embodiments. In certain embodiments, the angled head includes a threaded portion at the first end adapted to screw onto a threaded portion of battery housing (e.g., female threads and male threads respectively); the angled head also includes a light source assembly; the second end includes a threaded portion adapted for attachment of a threaded bezel (e.g., male threads and female threads respectively); a threaded portion of the angled head is configured to accept a threaded bezel that will also screw onto a threaded portion of the battery housing, thereby retaining a light source assembly in a position that is electrically connectable with batteries in the battery housing; the angled includes a bezel and/or light source assembly; the angled head is configured to accept a glass breaker; the angled head includes a glass breaker (e.g., a triangular metal glass breaker as described herein); the angled head includes a loop or ring for attaching a lanyard.

In another related aspect, the invention provides a flashlight kit that includes a battery housing, a rotatable angled head as described herein and a bezel with a light source assembly or a straight head. In particular embodiments, the bezel and the angled head are interchangeable on the battery housing to provide two different flashlight configurations. A first end of the angled head attaches to the battery housing and a second end of the angled head attaches to the bezel. The bezel is adapted to optionally attach to either the battery housing or the second end of the angled head, where attachment of the bezel to the battery housing provides a flashlight with a straight head, and attachment of the bezel to the angled head and attachment of the angled head to the battery housing provides a flashlight with a rotatable angled head (rotatable with respect to the battery housing). In other embodiments, the angled head is removable and replaceable with the straight head.

In particular embodiments, the battery housing, angled head, bezel, and/or light source assembly are as described herein.

The phrase "bezel is adapted to optionally attach to either the battery housing or the second end of the angled head" means that the bezel can be attached to either the angled head or to the battery housing at the option of the user.

As used herein, the term "battery housing" refers to a flashlight component that contains the batteries, with an opening for inserting the batteries. In many embodiments, the opening for inserting the batteries is the same opening at which the light source assembly is attached to the housing.

In the context of the present invention, the term "battery polarizer" refers to a component or combination of components in a battery powered device, such as a flashlight, that prevents the device from being energized by the batteries unless the batteries are inserted with correct orientation. Generally, the components are configured such that electrical contact will not be established unless the adjacent battery is inserted with correct orientation.

Indication that a flashlight head is "rotatable" means that with the head installed on a flashlight battery housing, the head can be rotated relative to the battery housing about a central axis passing through the connection between the head and battery housing and through the length of the battery housing, and that the rotation can be repeatedly performed in use of the flashlight. The rotation can occur over at least 120 degrees of rotation, in particular embodiments at least 180, 270, 360 degrees or even more. In cases where the head screws onto the housing, the rotation can also occur at the threaded connection.

In connection with the present flashlights, the term "longitudinal axis" or "long axis" refers to a line formed by the intersection of two perpendicular planes that bisect the flashlight passing through the front end and rear end of the housing.

With reference to the battery housing or flashlight body, the term "front end" refers to the end to which the bezel or head is attached, and "rear end" refers to the end opposite the bezel or head end.

For a flashlight that has a flattened cross-section such that there are two elongated sides and has a clip and/or a roll stabilizer, the term "front side" refers to the side having a clip, or if there is no clip, the side opposite the roll stabilizer. Conversely, the term "back side" refers to the side opposite the clip, or if there is no clip, the side having the roll stabilizer. If there is no clip and there is a roll stabilizer on both of the elongated sides, either side can be designated the front side and the other the back side.

The term "light source" refers to a component that generate light when electrically energized, e.g., by battery. Such light sources include, for example, light emitting diodes (LEDs), light bulbs, and the like.

The term "light source assembly" refers to an assembly that includes a fitting for a light source or an integrated light source. Generally for the present invention such assemblies are configured to retain the light source in the flashlight. An assembly can include components such as a socket or fitting for a light source, a light source, a reflector to direct light out of the flashlight, one or more lenses to direct light out of the flashlight and/or to protect the light source and/or reflector, electrical contacts to electrically couple an adjacent battery to the assembly, and the like.

The term "reflector" is used as is conventional for battery-powered flashlights, to refer to a component(s) for reflecting light from the bulb or other light source forward out of the flashlight. Such an assembly can also include the light source. Typically a flashlight also includes a lens covering and protecting the reflector and light source from external contact.

As used herein, the term "conductive material" refers to electrically conductive material, e.g., a metal such as copper, brass, bronze, aluminum, a steel, and the like.

As used in the context of an opening for inserting batteries and a battery row, the term "substantially aligned" indicates that the referenced components are sufficiently aligned that batteries can be inserted through the opening without binding on other batteries and/or other portions of the flashlight, and such that electrical connection can be obtained between a light source assembly attached at the opening and the adjacent battery that is substantially aligned with the opening. In many cases, the longitudinal axis of the battery row and the center of the opening will be aligned within 1, 2, 3, 4, or 5 mm of the longitudinal axis, although greater off-sets can also be designed.

As used in the context of the present angled heads, the term "replaceable attachment" and the like refer to the ability to repeatedly remove and replace the head from a battery housing without the need for any tools and without causing damage or other significant physical alteration to the battery housing or the head. If the flashlight is functional before such removal and replacement, the replacement restores a functional flashlight. This is intended to distinguish from a case where a flashlight head can be removed and replaced, but the procedure either requires one or more tools or results in damage or other physical alteration to the battery housing or to the head. In many cases, the head screws onto the housing, allowing convenient removal and replacement in similar manner to removal and replacement of a straight bezel on a conventional flashlight. Indeed, in particular embodiments, the body of the angled head is designed to accept a bezel (usually with a light source assembly) that will also attach to the battery housing without the angled portion of the angled head. As used herein in connection with glass breakers, the term "hard material" refers to a material that is sufficiently hard such that if the material is formed into a small triangular plate (e.g., an equilateral triangle 10–15 mm on each side and 2–4 mm thick) and is struck against a glass, it will indent the glass without permanently deforming the impacting point of the triangle (recognizing that many such hard materials are somewhat brittle and can break if struck such that there is a significant shear component to the impact force). Examples of such materials include, hard metals such as hardened steel, hard metal carbides such as tungsten carbide, and high strength ceramics.

Also as used in connection with glass breakers, the term "polygon" means a polygon having at least one angle or vertex having an included angle of no more than 135 degrees. Advantageously the polygon has at least one vertex having an included angle of no more than 120, 110, 90, 80, 70, or 60 degrees. In certain embodiments the polygon is a regular polygon such that all angles and lengths of sides are the same, e.g., equilateral triangle or square.

For specification of the angle of a glass breaker to the longitudinal axis of the battery housing, the angle specified is the included angle formed by two line segments AB and AC, where A is the intersection point of the longitudinal axis and a line from the tip of the glass breaker along the plane or axis of the glass breaker to the longitudinal axis of the battery housing. AB is then the line segment from intersection A to the front end of the housing, and AC is the line segment from the intersection A to the tip of the glass breaker. For purposes of definition, that included angle is designated $\alpha$. Alternatively, the angle may be specified as the angle (here designated $\beta$) (magnitude of $\beta$ is 0–90 degrees) between a line perpendicular to the longitudinal axis, to the line segment AC, such that positive values for $\beta$ correspond to $\alpha$ less than 90 degrees, and negative values for $\beta$ correspond to $\alpha$ greater than 90 degrees.

The present invention also concerns additional flashlight designs. In addition to flashlights that have side-by-side rows of batteries, particular features described herein can advantageously be incorporated in flashlights that have a single battery row, or are configured to use non-cylindrical batteries. For example, a glass breaker and/or a rotatable head as described herein can be incorporated in other flashlight designs, including flashlights that include a conventional, generally cylindrical battery housing.

For flashlights that include a rotatable head, preferably the housing includes a roll stabilizer, for example, a bar formed as part of the housing, an end cap on the housing, or a clip that allows the flashlight to be placed flat on the ground or other solid surface and prevents the flashlight from rolling. As an alternative, a clip, alone or in conjunction with the flashlight battery housing and/or head can be configured to provide a roll stabilizer. For example, a slip-on clip (i.e., a clip that attaches to the battery housing with a slip connection). The clip can, for example, sufficiently encircle the battery housing such that the clip is retained by friction from spring tension (e.g., spring tension produced by expanding the portion that fits around the housing). In many cases, the clip, or at least the portion encircling the housing, is formed of a plastic. In many cases, the clip arm is parallel to the long axis of the battery housing.

In addition to the glass breaker and/or rotatable head, such alternate design can include other features, which can be utilized singly or in any combination. These include, for example, impact resistance; water proofing; a clip (which can include a seat belt cutter); battery polarization; and gas venting.

Additional aspects and embodiments will be apparent from the following Detailed Description and from the claims.

BRIEF DESCRIPTION OF THE DRAWINGS

FIG. 4 is an exploded view of the flashlight of FIG. 1.

FIG. 5 is an exploded view of the right angle head, excluding the bezel and light source assembly.

FIG. 6 is an exploded view of the pivot contact, with battery polarization features.

DETAILED DESCRIPTION OF THE PREFERRED EMBODIMENTS

Figure 2:
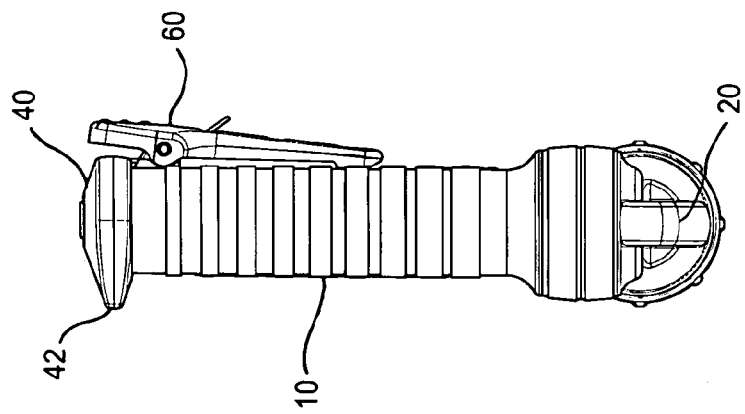
FIG. 2 shows the flashlight of FIG. 1 viewed from the side opposite the reflector, showing the rest bar on the side opposite the clip.

The flashlights of this invention include features and characteristics that make these flashlights especially advantageous for emergency workers, although the flashlight is not limited to such applications. Those features and characteristics can include a rotatable angled head, the ability to lay the flashlight on its back and have the flashlight be stable, a clip attached to the battery housing, e.g., at the end distal to the light-emitting portion of the flashlight, a seat belt cutter in the clip, a glass breaker, battery polarization, gas venting, low flash-risk light source, water proofing, and/or high impact resistance. Other advantageous properties can also be incorporated. For example, the flashlight can include a pivot contact for making electrical connection between side-by-side batteries, where the pivot contact has unequal length arms, and/or the angled head can be replaced with a straight bezel.

Housing

As is generally understood, battery housings for flashlights can be formed of a variety of different materials, generally metal or plastic, and are shaped using conventional processes, such as molding or stamping processes. While the present housings can be formed of metal, it is preferable to use moldable plastic of a type that provides good impact resistance, such as high density polyethylene or polypropylene.

The housing can be formed in a single piece, or of multiple pieces and then joined. For example, the housing could be formed in two symmetrical pieces and then joined along the centerline. Likewise, the rear end of the housing can be formed integrally or as a separate piece, e.g., as an end cap. In particular embodiments such an end cap is sealed to the main housing body, e.g., by gluing or welding. The separate end cap design can be advantageous to allow easier assembly of other components in the flashlight, e.g., a pivot contact and/or gas vent in the housing.

For a flashlight configured for side-by-side batteries, the housing is adapted to accept such a configuration. As a result, typically the housing will be elongated and generally oval in transverse cross-section, of sufficient size to accept two side-by-side rows of batteries to be inserted. The housing can be configured with a round opening at the front to which the bezel attaches and through which batteries can be inserted and removed. The back end is closed and a pivot contact is at the inside back of the housing. The front end opening is off-set from the centerline of the end, such that one of the rows of batteries will be generally in-line with the opening, but the other row will not. The pivot contact acts as a lever and provides a current path between the two rows of batteries. Thus, the housing will accept two rows of batteries, with each row containing one or two batteries. The row of batteries that is not in-line with the battery insertion opening can be termed the first row, and the row in-line with the opening can be termed the second row.

To insert the batteries, the housing is preferably held inclined with the back end lower than the front, and with the side having the opening to which the bezel attaches higher than the side away from the opening. The first battery inserted with then drop to the side of the housing away from the opening, and slide to the back end. If the housing is configured to accept a second battery in that same row (the first row), the second battery will drop into place adjacent the first battery. Once the first row of batteries is complete, the next battery inserted will be in the second row, and will slide down to the back end of the housing and contact the pivot contact. If the flashlight is configured to accept a second battery in the second row it will slide down to contact the other battery in that row. Installation of the bezel with the light source assembly will push the second row of batteries against one arm of the pivot contact, which levers against the first row of batteries forcing that row against an electrical contact at the inside front of the housing.

For flashlights with generally cylindrical housings, the flashlight can be configured as is typical for such flashlight shapes such that one or more batteries (e.g., 1, 2, 3, or 4) are inserted in-line within the hollow cylinder.

In other embodiments the cap at the rear end is removable or otherwise openable to allow battery insertion at the rear end.

Rotatable Head

As indicated above, in many embodiments the present flashlights include a rotatable, angled head. The head attaches to the battery housing at the front of the housing. Preferably that connection is a threaded connection, which can be sealed against moisture entry, e.g., using an elastomeric O-ring. Likewise, the connection between the angled head body and the bezel can be sealed, e.g., using an elastomeric O-ring. While the head can be constructed to have any of a variety of angles, in many cases the angled head will make approximately a 90 degree angle (e.g., 80–100 degrees to the long axis of the battery housing, when the head is installed on the housing. However, in certain embodiments, the head makes an angle of 90±60, 90±45, 90±30, 90±20, 90±10, or 90±5 degrees to the long axis, or other angle as described herein. In some applications an angled head that makes an angle to the long axis different from 90 degrees is advantageous. For example, a flashlight clipped on a users belt can then shine on the ground in front of the person rather than having the primary light beam shine horizontal to the ground.

Advantageously, the rotatable head does not have protrusions that extend beyond the head-to-housing connection other than the angled portion of the head itself. Thus, preferably there are no such protrusions around at least 180 degrees. As a result, when such a flashlight is placed on its back on a flat level surface with the light-emitting portion of the head pointing directly upward, the head can be rotated to either side without altering the contact of the flashlight on the level surface until the angled portion of the head, e.g., the bezel, contacts that surface. This is beneficial for construction of a flashlight that can be placed in such a position and will be stable when the head is rotated to various positions.

The rotatable head includes a light source assembly (in many cases held in place with a bezel) in addition to an angled knuckle or body. Flashlight bezels are typically formed of plastic, with female threads for attachment to the battery housing or the knuckle portion of an angled head. Such bezels can be used in the present invention. In addition, preferably the bezel forms a waterproof seal with the housing. Such a seal can be provided by an O-ring that fits in an annular channel in the housing, preferably behind a threaded portion of the housing that mates with the bezel.

As with many flashlights, the bezel holds a light source assembly that holds or is adapted to hold a light source, e.g., a LED or bulb. For the present invention, preferably the battery contacting portion of the knuckle, or the rear portion of the light source assembly (if the flashlight does not include a knuckle), is configured to contribute to battery polarization. Generally the positive terminal of a battery bears against a central contact (which may be a central contact of a light bulb) of the knuckle or light source assembly. To provide battery polarization, the battery contact portion of the knuckle or rear portion of the light source assembly can be configured to allow electrical contact with a standard positive terminal of a battery, but not with the negative terminal (or the converse). For example, if the central contact is recessed relative to a non-conductive or electrically isolated annular ring (or partial ring), the protrusion on the positive terminal of a standard battery for flashlight use (or other similar uses) can contact the central contact, but the flat negative terminal of the battery will only contact the non-conductive ring. Thus, if a battery is inserted with incorrect orientation, an electrical path will not be created between the battery and such a knuckle and light source assembly.

Glass Breaker

Glass breakers incorporated in a flashlight allow the flashlight to be used to break glass effectively without the need to obtain additional tools. Such a flashlight is especially useful to enable emergency workers such as firefighters, police, and paramedics to break through building or car windows in emergency situations. Glass breakers incorporated in flashlights function by driving a small surface area point into the glass surface, creating very high local forces, thereby breaking the glass. In most cases, a person swings the flashlight against the glass such that the glass breaker point impacts the glass, and the impact force is created from the kinetic energy of the heavy, swinging flashlight. Certain glass breakers have been used with flashlights, including conical points that protrude from an end of a flashlight in line with the flashlight axis, conical points that protrude transversely from the back end of a flashlight, and slidable points that are driven into the glass. Such glass breakers are useable in the present invention, as well as other glass breaker designs.

An advantageous glass breaker has a point for contacting the glass, and opposite the point has a large surface area that bears against the flashlight housing (or other portion of the flashlight) for efficiently coupling the kinetic energy from the flashlight through the glass breaker point to the glass surface. Beneficially, the surface area that bears against the flashlight housing is at least 6, 8, 10, 12, 15, 18, 20 or more $mm^2$. An advantageous glass breaker is formed of a hard material, such as a hard metal such as hardened steel, hard metal carbides such as tungsten carbide, or a ceramic. In certain embodiments, the hard material is formed as a polygonal plate, such as a triangular or rectangular shape e.g., 1–4 mm thick. A particularly advantageous such item is a carbide machine tool insert. Preferably such an insert has a central hole, such an insert can be fastened to the flashlight with a screw or other such fastener. For glass breakers mounted at the rear of the flashlight, such a polygonal plate glass breaker (as well as other glass breaker designs) is advantageously angled such that the protruding point is closer to the front end of the flashlight than is the opposite side or sides. While that angle can vary, in particular embodiments it is equal or greater than 45 degrees but less than 90 degrees with respect to the longitudinal axis of the housing, 45–85 degrees, 60–85 degrees, or 65–80 degrees. Similarly, for flashlights in which the glass breaker is mounted at the front end of the flashlight, usually on the head, such a glass breaker can be mounted such that the protruding point is closer to the rear of the flashlight than is the opposite side or sides, e.g., at an angle as just indicated for glass breakers mounted at the rear.

Such triangular or other polygonal glass breakers provide multiple points, such that the glass breaker can be flipped over and/or rotated to provide a new point when one point becomes chipped or worn. In the case of the machine tool inserts, typically such inserts have three corners or vertices. Each of the vertices can provide two impact points, one at each corner. Impact can be concentrated on only one point rather than on the entire vertex, by impacting the glass with the insert at an angle different from perpendicular to the glass, e.g., 5–45 degrees away from the perpendicular. Preferably the angle from the perpendicular is 5–30 degrees, 10–30 degrees, 10–25 degrees, or 10–20 degrees. In addition to presenting minimal impact surface area, as explained above, angling a flattened glass breaker in this manner can also provide more efficient energy coupling between the flashlight and a glass being impacted, and reduce the risk of chipping or breaking the glass breaker.

For a glass breaker positioned at one end of a flashlight and protruding transversely, angling a flattened glass breaker allows more efficient energy coupling because the back (surface of the flattened glass breaker that is against or nearest the flashlight) as well as the edge of the triangle opposite the impacting point can bear against the housing, resulting in more efficient energy transfer, reducing the chance that the housing will break, and minimizing the shear forces on the glass breaker.

In addition, angling the flattened glass breaker reduces the chance of chipping or breaking the tip because all the major forces on the glass breaker are then compressive forces, rather than shear forces. Many hard metals (and other hard materials) tolerate compressive forces very well, but are relatively brittle and so are more vulnerable to shear forces. Angling the glass breaker as indicated causes the force to be directed from the impact point into the glass breaker toward the end cap or housing, so that shear forces are minimized. The resistance to chipping and breaking can be further enhanced by minimizing the portion of the glass breaker that is not supported by the housing, head, or other mounting portion of the flashlight, such as by providing minimum protrusion for the point and providing lateral support. For example, a triangular glass breaker can fit into a recess in the housing or head so that only the top surface and the impact point are not in contact with the housing or head, e.g., approximately 2 mm protrusion. Such a flattened, triangular glass breaker can be held in position with a center screw.

Clip and Seat Belt Cutter

For embodiments that include a clip for hanging the flashlight, the clip can be attached in various ways, e.g., attached at the end of the flashlight distal from the light-emitting emitting end, i.e., the back end, or attached toward the light-emitting end (e.g., slip-on clip that fits around the housing. Where the clip is attached distal from the light emitting end, when a person, such as an emergency worker, clips the flashlight to his chest to provide hands-free work capability, the light is being emitted a greater distance from the person's eyes, thereby lessening the likelihood that the light will shine into the person's eyes.

While the clip can be a spring clip or rigid clip, in particular embodiments, the clip is attached via a spring hinge to the housing. In other embodiments, the clip is a slip-on spring clip (e.g., metal or plastic) that slips onto the battery housing with sufficient friction to be retained in place (retention can be assisted by locking a portion of the clip into a slot, opening, groove or other structure that increases retention capability. A clip can also be configured to provide a cutter, e.g., a seat belt cutter. Such a cutter should be shielded to protect fingers and other body parts, as well as to minimize the chance that other items will be inadvertently cut. In most cases, such a cutter will be constructed with a single exposed blade located within a slot. A thin article (e.g., a seat belt strap) to be cut can then be slipped into the slot, contacting the blade and cutting the article. The width of the slot can be selected to allow entry of items that are desirable to cut, while excluding thicker articles.

While the blade can be of various types, preferably the blade is a thin sharpened steel blade, that can be sharpened on one, or more than one edge. When sharpened on more than one edge, the blade can be re-oriented to present a fresh edge when one edge becomes dull.

Pivot Contact

As described above, the present invention advantageously uses a pivot contact located in the interior of the housing at the rear end. The pivot contact provides electrical contact between two rows of batteries, while also allowing easy insertion and removal of batteries. The pivot contact is also preferably designed to include battery polarization. As described in more detail below, an exemplary pivot contact is shown in FIGS. 4 and 6. The exemplary pivot contact functions as a lever with unequal length arms. As shown in the Figures, the unequal length arms result from an off-center placement of the pivot point. In the illustrated flashlight, when batteries are installed and the bezel is screwed onto the housing, the pivot contact bears against the inside back wall of the battery housing on the curved pivot or rocker surface.

The unequal length arms result in easier battery insertion and removal. The batteries are easier to insert due to improved clearance for the first row of batteries to be inserted. As described above for the battery housing, to insert batteries, the housing (with bezel removed, is preferably held inclined, with the back of the housing lower than the front. The housing is held with the side of the housing having the front opening up. In this orientation, upon insertion of the first battery, the battery will drop to the lower side of the housing and slide to the back, contacting the long arm of the pivot contact. Whether the flashlight is configured to accept a second battery in that row or only one battery, sufficient clearance is provided so that the last battery will readily drop into place without additional pressure or manipulation being needed. Similarly, on removal, the provision of such clearance allows the batteries to drop out without the need for further manipulation to release them.

Such clearance is provided because the long arm does not include a spring that will take up the clearance (and preferably has no spring). The short arm of the pivot contact generally is fitted with a spring (preferably on the front (the side toward the front of the housing). Thus, when the second row of batteries is filled, and the bezel with the light source assembly is attached to the front of the housing, the light source assembly contacts the second row of batteries, forcing the batteries into the short arm of the pivot contact, thereby pushing the short arm back and levering the long arm forward into the first row of batteries. Because of the unequal length arms, the long arm travels further than the short arm, causing the first row of batteries to press against an electrical contact at the front of the housing. Because the long arm travels further than the short arm, ample clearance can be provided for the first row of batteries, resulting in easier battery insertion. The longer travel of the long arm still allows positive contact to be made between the first row of batteries and both the pivot contact and the electrical contact at the front of the housing, despite the provision of enough clearance to allow easy battery insertion and removal.

The ability of the pivot contact to act as a lever, i.e., like a teeter totter, can be provided by a variety of different constructs. Preferably the pivot contact has a curved protrusion on its back that bears against the inside of the back of the housing extending transversely across the contact. The pivot contact then rocks on that protrusion. In other embodiments, the pivot contact can be provided by a transverse protrusion on the back of the pivot contact in a different shape, such as triangular protrusion; the protrusion can be formed in the back end of the housing; the pivot is provided by a hinge, such as opposing hinge pins that extend into matching sockets in the sides of the housing. For any configurations of the pivot contact, preferably the pivot contact and the inside back of the housing are configured such that the back of one arm of the pivot contact bears against the inside back of the housing when the flashlight is assembled with batteries in place. Such a configuration makes the pivot contact more resistant to failure than if all the pressure is placed on the pivot point.

As described herein, preferably the flashlight is configured to have battery polarization. Exemplary constructs for accomplishing such polarization are described below. In certain embodiments, the pivot contact includes constructs that participate in that battery polarization. Exemplary constructs are described below in the discussion of battery polarization and with reference to the Figures.

Typically, the lever portion of the pivot contact will be constructed of molded plastic. The electrical path can then be provided by a metal piece that connects the negative terminal of the rear-most battery in one row with the positive terminal of the rear-most battery in the other row. The metal piece can conveniently be a coil spring on the short arm of the pivot contact with an extension leg extending to the long arm to contact the other battery row.

Battery Polarization

In order to reduce the risk of battery damage and potential battery explosion, it is advantageous to configure the flashlight to have battery polarization, meaning that completing an electrical circuit to energize the light source will only be possible if the batteries are inserted with correct orientation. For designs using two, three, or four batteries with one or two batteries in each battery row, this can be accomplished using suitable components at the ends of each row of batteries. That is, components can be shaped such that electrical contact will occur if the orientation of the adjacent battery is correct, but not if the orientation is reversed. As an example of how this can be accomplished, if electrical contact is to be made with the positive terminal of a conventional cylindrical battery (such as a C dry cell battery), a central contact is provided, at least partially surrounded by a non-conductive material that prevents electrical contact with the flat negative terminal of such batteries. Conversely, if contact with the negative terminal is intended, a contact ring or other non-central contact is provided that will contact the flat surface of the negative terminal, but with a central stand-off such that if the positive terminal is contacted, the central stand-off will bear against the protrusion of the positive terminal and hold the adjacent end of the terminal away from the electrical contact ring (or other electrical contact. Other battery polarization constructs can also be utilized.

Figure 8:
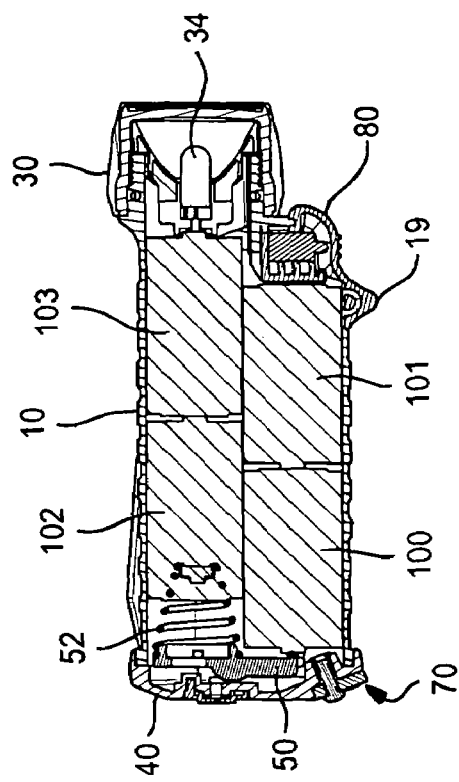
FIG. 8 is a cross-section of the flashlight of FIG. 7 along the longitudinal axial plane.
Figure 9:
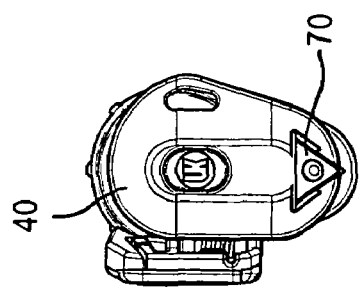
FIG. 9 is a view of the rear end of the flashlight of FIG. 7, showing a plan view of the exemplary triangular glass breaker and the hole for a lanyard.
Figure 7:
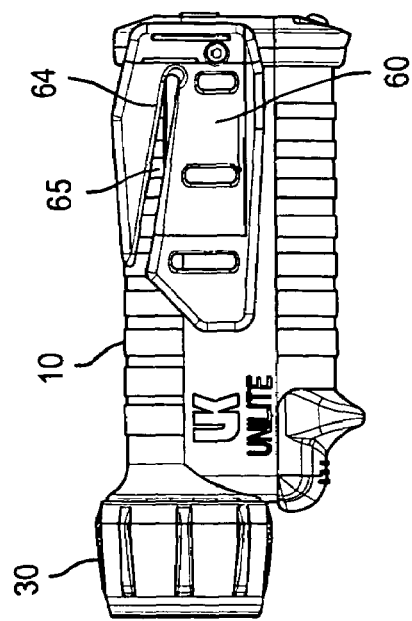
FIG. 7 is a clip-side view of a flashlight with a glass-breaker and a seatbelt cutter, and having a straight bezel, showing the combination clip/seatbelt cutter.

Exemplary flashlights are show in FIGS. 1–9. FIGS. 1–6 illustrate an exemplary flashlight 1 that incorporates a rotatable angled head and a clip, but without a seat belt cutter in the clip and without a glass breaker. FIGS. 7–9 illustrate an exemplary flashlight 2 that has a glass breaker and a seat belt cutter in a clip, but with a straight, or in-line, head instead of an angled head. As indicated above, the angled rotatable head, and glass breaker can be incorporated in a flashlight design individually or in combination, and a seat belt cutter/clip can also be incorporated. In describing the figures, the same numbers are used for components that are the same for the two embodiments illustrated.

Figure 1:
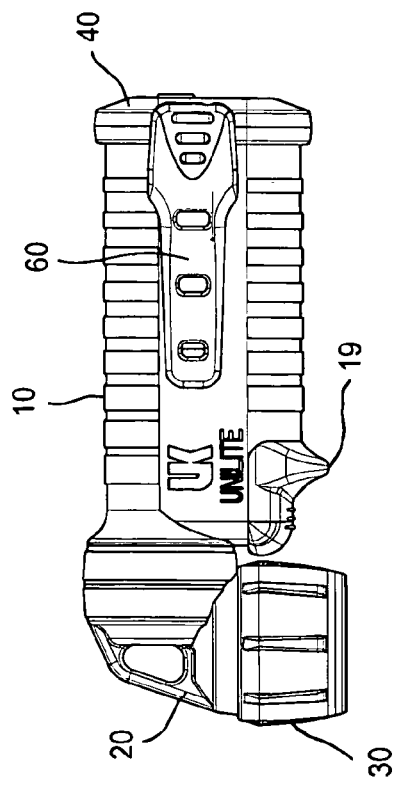
FIG. 1 shows a view of a flashlight with a 90 degree rotatable head, a clip, and a stable rest, view from the clip side.

FIG. 1 shows a side view of an exemplary flashlight 1 that includes a right angle rotatable head. The battery housing 10 encloses the batteries. A right angle rotatable head 20, including a bezel 30, is attached at the front end of the housing 10, and an end cap 40 is joined to the rear end of the housing 10 to complete the body of the flashlight. Typically the end cap is welded to the battery housing, such as by thermal or solvent welding. Alternatively, the battery housing and end cap can be molded as a single unit. However, such a unitary flashlight body makes assembly of internal components more difficult. A hinged clip 60 is attached to the front side of the housing 10 allowing the user to clip a flashlight onto a belt or other desired location.

As shown in FIG. 2, the end cap includes a protruding roll stabilizer 42 that stabilizes the position of the flashlight when it is laid on the back side.

Figure 3:
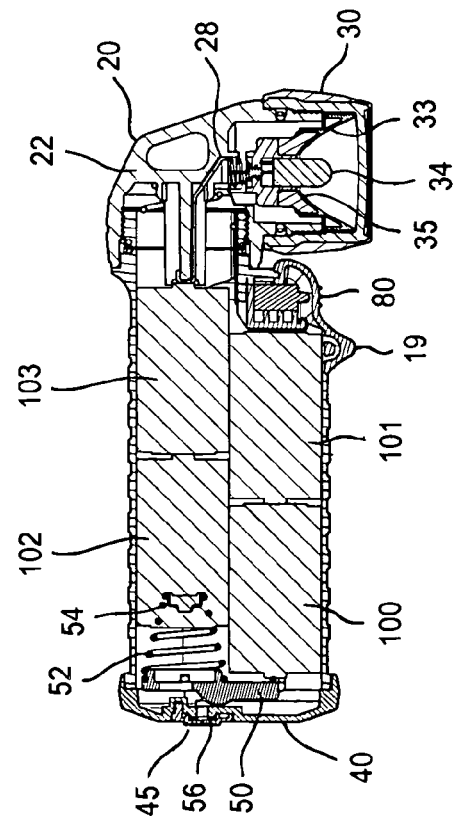
FIG. 3 is a cross-sectional view of the flashlight of FIG. 1, sectioned along the longitudinal axial plane.

FIG. 3 is a cross-section of the flashlight along the longitudinal axis, bisecting the flashlight in the flattened dimension. FIG. 3 shows the positioning of the components in an assembled flashlight with batteries installed. However, those components are more readily identified in FIG. 4.

As shown in the exploded view in FIG. 4 the clip 60 consists of the clip body 61, hinge spring 62, and hinge pin 63 that are together installed on the hinge posts 16 on the front side of the battery housing 10 to provide a spring tension clip.

Switch 80 is installed internally inside of switch cover 19, such that compressing the switch cover above the protrusion actuates the switch 80.

Pivot contact 50 is installed in the end of the battery housing with the retaining pin 55 extending into retention pockets in the inside of battery housing 10 (not shown). Installation of the end cap 40 on the battery housing 10 locks the pivot contact 50 into place. A curved pivot 56 on the back of the pivot contact fits into a complementary curved depression 41 on the inside surface of the end cap 40. Also shown in this view are the roll stabilizer 42 and lanyard hole 43 in the end cap. The lanyard hold accommodates a loop or cord.

To provide gas venting, a gas permeable membrane 44 covers an opening (not shown) through the end cap 40 and is retained in place with vent cover 45.

To use the flashlight, batteries 100 and 101 are inserted through housing opening 15, thereby constituting the first row of batteries, and batteries 102 and 103 are inserted constituting the second row of batteries.

The rotating head 20 screws onto the battery housing 10 at threaded head connection 12. A waterproof seal is formed at that point with elastomeric O-ring 18 which fits in angular groove 14. The head 20 includes right angle knuckle 22, light source assembly 32 and bezel 30.

Certain components of the head 20 are shown in more detail in the exploded view in FIG. 5. As shown, the right angle knuckle 22 includes housing connection portion 25, bezel connection threads 24 and angular ring 23 into which fits elastomeric ring 29 to form a seal with bezel 30. Positive terminal spring contact 28 is fitted within knuckle 22. When the flashlight is assembled the spring contact 28 provides an electrical path between the positive terminal of battery 103 and the central terminal of light bulb 34 (FIG. 3). Negative terminal contact spring 27 is also installed internally in knuckle 22, fitting within negative terminal contact ring 26. When the head 20 is installed on battery casing 10, negative contact ring 26 is held against switch contact arm 81 (FIG. 4), thereby providing an electrical connection to the negative terminal of battery 101 when switch 80 is in a closed position. The arm of negative spring contact 27 when installed, extends toward light source assembly 32, contacting light bulb fitting 35 (FIG. 3) and creating electrical contact with light bulb 34.

The pivot contact is shown in greater detail in FIG. 6. Pivot contact 50 includes a support plate 51, coil spring 52, eyelet 53, and plug 54. Spring leg 58 fits under brackets 56 and the coil portion of spring 52 is frictionally retained on ring 57. A metal eyelet 53 is soldered to the small end of coil spring 52. In the center of that eyelet is nonconductive plug 54. Eyelet 53, plug 54, spring leg 58, and bracket 56 together provide part of the battery polarizer function. These components contribute to battery polarization because if the negative terminal of battery 102 contacts the spring side of the pivot contact, electrical contact can be established between the negative terminal of battery 102 and eyelet 53. In contrast, if the positive terminal of battery 102 is oriented toward the coil spring 52, the protrusion at the positive terminal of battery 102 contacts nonconductive plug 54, holding the battery away from eyelet 53 such that electrical contact is not made between the battery and the eyelet. Likewise, on the other arm of pivot contact 50 the positive terminal of battery 100 can project between brackets 56 and contact spring leg 58 thereby establishing electrical contact, but the negative terminal of battery 100 would contact bracket 56 and not contact spring leg 58 thereby preventing electrical contact. Therefore, if either battery 102 or 100 is oriented incorrectly, the electrical path will be broken at one or both of the contacts with the pivot contact 50, preventing formation of an electrical circuit.

A second embodiment is shown in FIGS. 7–10. In this embodiment equivalent components are assigned the same numbers as in FIGS. 1–6. Therefore, those components will not be discussed in connection with these figures except as needed to describe the differing features of the second embodiment. As shown in FIG. 7, in this embodiment bezel 30 threads directly on battery housing 10 and thus does not have the rotatable angled head as in the preceding embodiment. Clip 60 includes a slot 65 and blade 64 such that the clip also constitutes a seatbelt cutter.

Additionally, as shown in FIG. 9, this embodiment includes a glass breaker 70 fitted to end cap 40.

Figure 10:
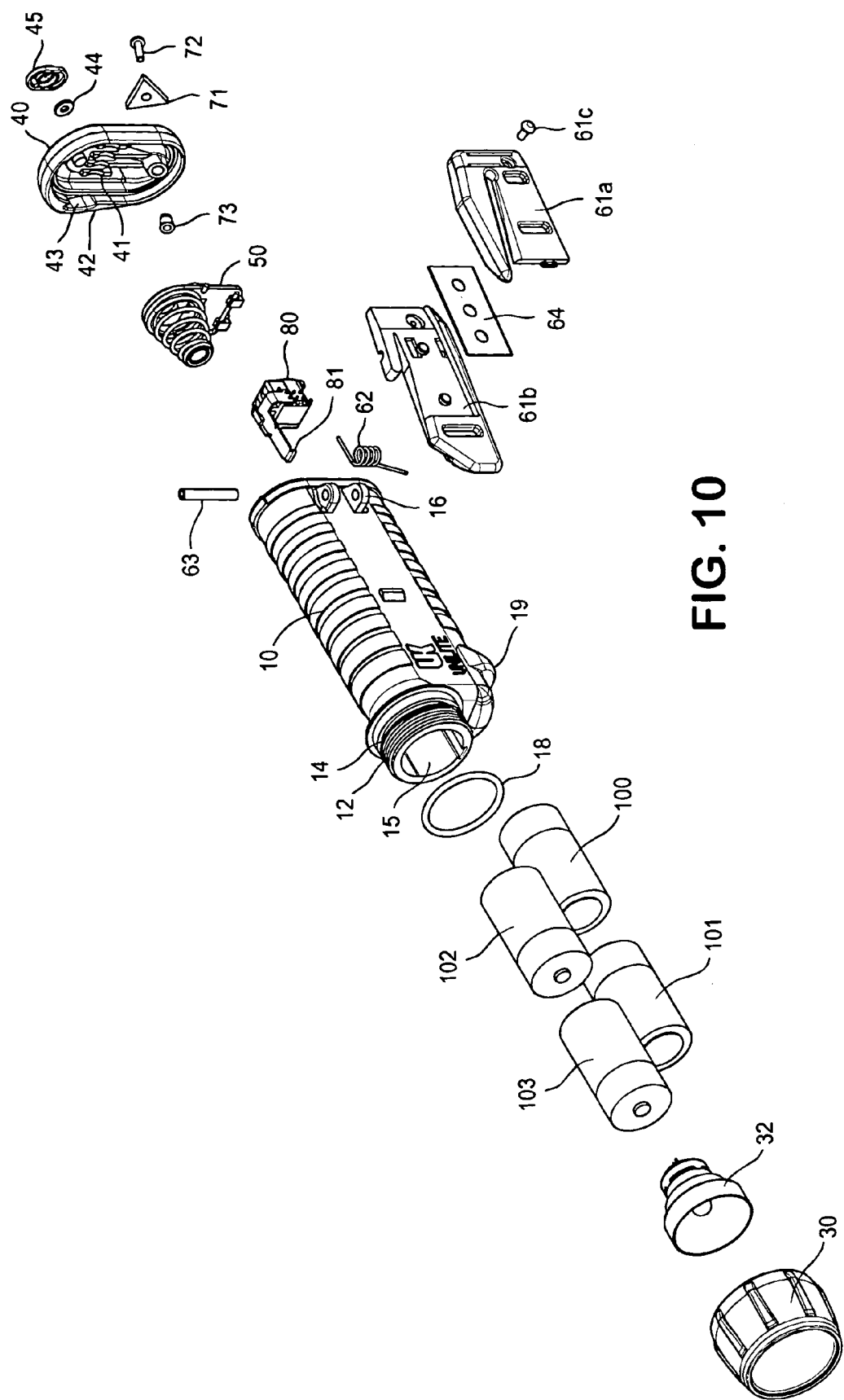
FIG. 10 is an exploded view of the flashlight of FIG. 7.

The seatbelt cutter and glass breaker are shown in greater detail in FIG. 10. Clip 60 has a front body piece 61a and a rear body piece 61b that clamp blade 64 in position between them and are held together with screw 61c.

The glass breaker consists essentially of a triangular carbide machine tool insert 71 that fits within a depression in end cap 40 (FIG. 8 and FIG. 9) and is retained in position with screw 72 that threads into female threaded fitting 73.

As shown in FIG. 8 the triangular insert 71 is installed at an angle of about 75° from the longitudinal axis of the battery housing (or about 15° from the perpendicular to the longitudinal axis). Due to this angle, when the flashlight is swung such that the glass breaker impacts a glass surface, such as a car window, the force on the carbide insert is essentially all compressive force, with energy coupling between the insert and the end cap at the back surface and the inner face of the insert. In contrast, if insert 71 were installed perpendicular to the long axis of the battery housing 10 the forces on the insert when the flashlight is swung to contact a glass surface would be a combination of sheer forces and compressive forces. The sheer forces would be present because the usual impact angle would create a force component pulling the insert away from the end cap 40 against screw 72. This would greatly increase the likelihood of chipping the carbide insert 71.

Figure 11:
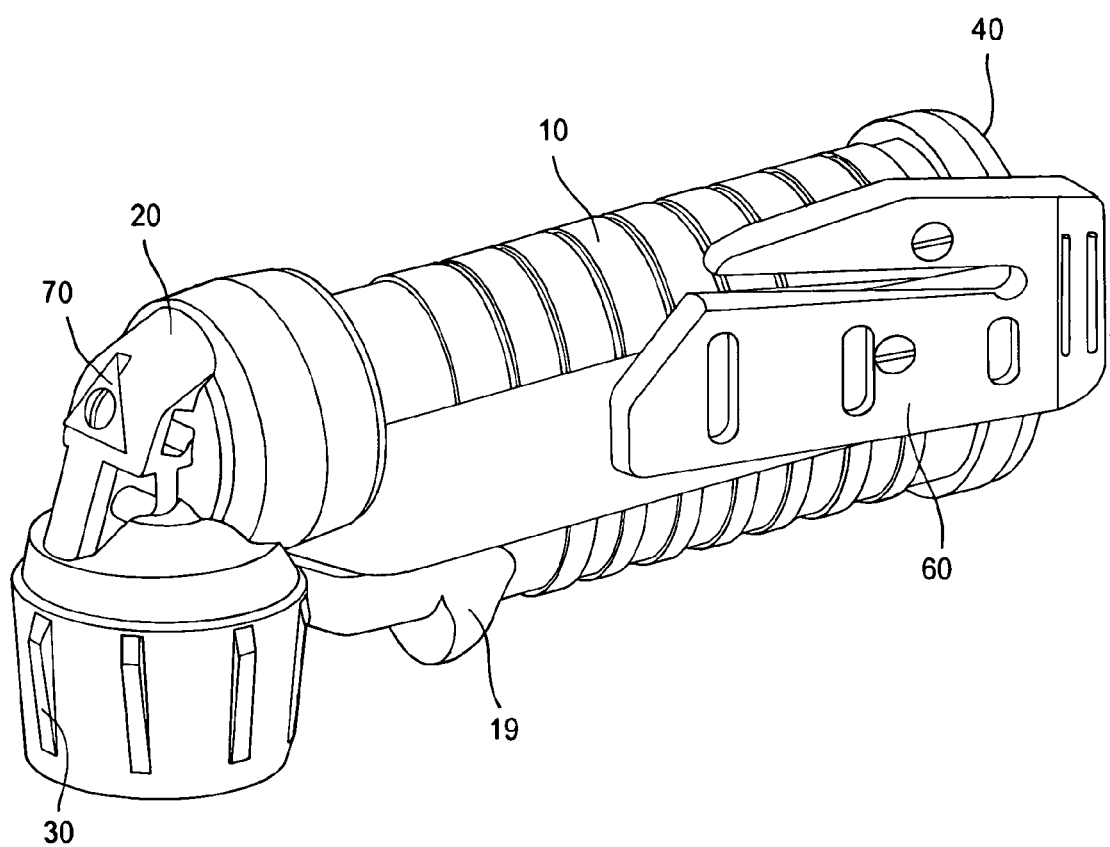
FIG. 11 is a view of an embodiment illustrating a triangular glass breaker mounted in the knuckle of a rotatable angled head.

An alternative mounting of the glassbreaker (in this case a triangular insert) is shown in FIG. 11. In this embodiment, the triangular insert 71 is mounted on the knuckle 22 of an angled rotatable head 20.

Figure 12:
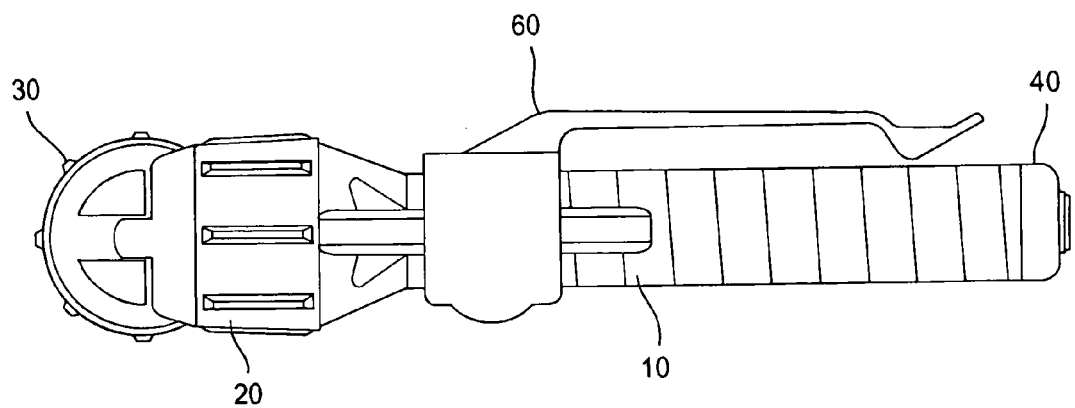
FIG. 12 is a view of an embodiment with a slip-on clip mounted on the housing such that the flashlight can be clipped on a suitable location, e.g., a user's belt.

An embodiment with a slip-on clip is illustrated in FIG. 12. The clip 60 is mounted on the housing 10 toward the front end. In this configuration the flashlight can be clipped onto a user's belt or other suitable attachment location, typically placed such that the light beam is well away from the user's face and eyes.

As previously described, preferred embodiments include features from both of the first two exemplary embodiments. A particularly preferred embodiment includes a rotatable angled head as shown in the first embodiment, along with a glass breaker and a seat belt cutter as shown in the second embodiment.

All patents and other references cited in the specification are indicative of the level of skill of those skilled in the art to which the invention pertains, and are incorporated by reference in their entireties, including any tables and figures, to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, the battery housing can be constructed of a variety of different materials, the pivot contact can be configured in various ways, and the glass breaker can be of various sizes. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values are provided for embodiments, additional embodiments are described by taking any 2 different values as the endpoints of a range. Such ranges are also within the scope of the described invention.

Thus, additional embodiments are within the scope of the invention and within the following claims.

What is claimed is:

1. A flashlight comprising
   a battery housing comprising a front end and a rear end, wherein said housing has a flattened cross-section defining a front side and a back side and is configured to accept a plurality of batteries in a side-by-side configuration comprising adjacent first and second rows of batteries;
   a pivot contact at the interior of said rear end providing an electrical connection between a battery in said first row to a battery in said second row, wherein said contact comprises a support with a pivot and a conductive material configured to provide an electrical path between said adjacent rows of batteries;
   a rotatable head comprising a circular housing connection and a light source assembly, wherein said housing connection is attached to said housing at said front end, wherein said light source assembly is oriented at 90±30 degrees to the long axis of said battery housing, said rotatable head is rotatable about said long axis, and said rotatable head is free of protrusions; and
   electrical connections for providing electrical power from said batteries to a light source in said light source assembly.

2. The flashlight of claim 1, further comprising a glass breaker comprising a flattened hard material triangle or rectangle mounted at said rear end or at said head, with a vertex of said triangle protruding transversely from said housing or said head and the side of said triangle opposite said vertex bearing against said housing or said head.

3. The flashlight of claim 1, wherein said rotatable head is changeable with a bezel and light source assembly.

4. The flashlight of claim 1, further comprising a clip attached at said rear end, wherein said clip comprises a seat belt cutter.

5. The flashlight of claim 2, wherein said glass breaker is at an angle of 70–85 degrees to the long axis of said battery housing.

6. The flashlight of claim 1, wherein said pivot contact comprises an off-center pivot.

7. The flashlight of claim 1, wherein said pivot contact further comprises a coil spring aligned with said second row of batteries, oriented toward said opening.

8. The flashlight of claim 7, further comprising polarizing contacts at said spring.

9. The flashlight of claim 1, further comprising a battery polarizer, such that only if said batteries are inserted with correct orientation will an electrical circuit be established to energize the light source.

10. The flashlight of claim 1, further comprising a gas vent allowing venting of gases from said housing.

11. The flashlight of claim 1, wherein said flashlight is adapted for use in hazardous environments.

12. The flashlight of claim 1, wherein said flashlight is waterproof.

13. The flashlight of claim 1, wherein said flashlight passes the UL 30 foot drop test.

14. The flashlight of claim 1, wherein said head is threaded to said housing.

15. The flashlight of claim 1, wherein said housing is configured to accept 4 cylindrical batteries with two batteries in each of said rows.

16. The flashlight of claim 1, wherein said pivot contact comprises a curved pivot surface on the back of said contact.

17. The flashlight of claim 1, wherein an arm of said pivot contact presses against the inside of the rear end of said housing when said flashlight is closed with batteries in place.

18. The flashlight of claim 2, wherein said triangle is a carbide machine tool insert.

19. The flashlight of claim 18, wherein said triangle provides 6 impact points.

20. The flashlight of claim 1, wherein said housing comprises a flattened transverse bearing surface on said back side, such that said bearing surface stabilizes said flashlight when said flashlight is laid on its back on a level surface.

21. The flashlight of claim 1, wherein said seat belt cutter comprises a multi-edge blade.

22. A flashlight, comprising:
a battery housing comprising a front end and a rear end;
a rotatable head comprising a circular housing connection, wherein said housing connection is attached to said housing at said front end and is replaceably removable at said housing connection to allow insertion of batteries, said rotatable head bears a light source assembly oriented at 90±30 degrees to the long axis of said battery housing, and said rotatable head is rotatable about said long axis; and
electrical connections for providing electrical power from said batteries to a light source in said light source assembly;
wherein said housing has a flattened cross-section defining a front side and a back side and is configured to accept a plurality of batteries in a side-by-side configuration comprising adjacent first and second rows of batteries.

23. The flashlight of claim 22, further comprising a pivot contact at said rear end providing an electrical connection between a battery in said first row to a battery in said second row, wherein said contact comprises a support with an off-center pivot and a conductive material configured to provide an electrical path between said adjacent rows of batteries.

24. The flashlight of claim 22, wherein said housing comprises an opening at said front end aligned with said second row, for insertion of said batteries, and
wherein said pivot contact has a short side oriented for contact with said second row.

25. The flashlight of claim 23, wherein said pivot contact further comprises a coil spring on said short side, oriented toward said opening.

26. The flashlight of claim 25, further comprising polarizing contacts at said spring.

27. The flashlight of claim 22, further comprising a battery polarizer, such that only if said batteries are inserted with correct orientation will an electrical circuit be established to energize the light source.

28. The flashlight of claim 22, further comprising a gas vent allowing venting of gases from said housing.

29. The flashlight of claim 22, wherein said flashlight is adapted for use in hazardous environments.

30. The flashlight of claim 22, wherein said flashlight is waterproof.

31. The flashlight of claim 22, wherein said flashlight passes the UL 30 foot drop test.

32. The flashlight of claim 22, wherein said head is threaded to said housing at said housing connection.

33. The flashlight of claim 32, wherein threading said head on said housing with batteries in said housing establishes electrical contact at said pivot contact.

34. The flashlight of claim 22, wherein said housing is configured to accept 4 cylindrical batteries with two batteries in each of said rows.

35. The flashlight of claim 34, wherein said batteries are C batteries.

36. The flashlight of claim 22, wherein said pivot contact comprises a curved pivot surface on the back of said contact.

37. The flashlight of claim 22, wherein an arm of said pivot contact presses against the inside of the rear end of said housing when said flashlight is closed with batteries in place.

38. The flashlight of claim 22, further comprising a glass breaker attached at the rear end of said housing.

39. The flashlight of claim 38, wherein said glass breaker comprises a flat hard material polygon configured such that a side or sides of said polygon bears against said housing and the vertex opposite said side or sides extends transversely from said housing sufficiently to enable the vertex to contact a glass surface.

40. The flashlight of claim 39, wherein said flat polygon is oriented at an angle of 45–90 degrees to the long axis of said housing.

41. The flashlight of claim 40, wherein said angle is 55–85 degrees.

42. The flashlight of claim 40, wherein said angle is 65–80 degrees.

43. The flashlight of claim 39, wherein said polygon is a carbide machine tool insert.

44. The flashlight of claim 39, wherein said polygon is a triangle and provides 6 impact points.

45. The flashlight of claim 38, wherein said glass breaker comprises an impact point and a surface or surfaces distal from said point bearing against said housing for coupling kinetic energy between said housing and said impact point, wherein the area of said surface is at least 10 mm$^2$.

46. The flashlight of claim 22, wherein said housing comprises a flattened transverse bearing surface on said back side at said rear end, such that said bearing surface stabilizes said flashlight when said flashlight is laid on its back on a level surface.

47. The flashlight of claim 22, further comprising a clip attached on said front side at said read end, wherein said clip comprises a seat belt cutter.

48. The flashlight of claim 47, wherein said cutter comprises a multi-edge blade.

49. A flashlight comprising
a battery housing comprising a front end and a rear end, wherein said housing has a flattened cross-section defining a front side and a back side and is configured to accept a plurality of batteries in a side-by-side configuration comprising adjacent first and second rows of batteries;
a rotatable head comprising a circular housing connection and a light source assembly, wherein said housing connection is attached to said housing at said front end, wherein said light source assembly is oriented at 90±30 degrees to the long axis of said battery housing, said rotatable head is rotatable about said long axis at said circular housing connection, and said rotatable head is free of protrusions; and
electrical connections for providing electrical power from said batteries to a light source in said light source assembly.

50. The flashlight of claim 49, wherein said battery housing is openable at said rear end for insertion of said batteries.

51. The flashlight of claim 49, wherein said rotatable head is removable to allow insertion of said batteries.

52. The flashlight of claim 49, further comprising a pivot contact at the interior of said rear end providing an electrical connection between a battery in said first row to a battery in said second row, wherein said contact comprises a support with a pivot and a conductive material configured to provide an electrical path between said adjacent rows of batteries.

53. The flashlight of claim 49, further comprising a glass breaker mounted at said rear end or said head and protruding transversely.

54. The flashlight of claim 49, further comprising a glass breaker comprising a flattened triangle formed of a hard material mounted at said rear end or on said head with a vertex of said triangle protruding transversely from said housing or said head and the side of said triangle opposite said vertex bearing against said housing or said head.

55. The flashlight of claim 49, further comprising a clip attached at said rear end, wherein said clip comprises a seat belt cutter.

56. A rotatable angled flashlight head, comprising:
a body having a first end adapted for replaceable attachment to a flashlight battery housing, and a second end adapted for holding a light source assembly, wherein a central axis passing through said first end makes an angle of 90±30 degrees with a central axis passing through said second end; and
electrical connections within said device configured to electrically connect batteries in said battery housing with a light source in said light source assembly,
wherein said angled flashlight head is rotatable about the central axis through said first end when installed on a battery housing; and
wherein said angled head comprises a threaded portion at said first end adapted to screw onto a threaded portion of said battery housing.

57. The angled head of claim 56, wherein further comprising said light source assembly.

58. The angled head of claim 56, wherein said second end comprises a threaded portion adapted for attachment of a threaded bezel.

59. The angled head of claim 58, wherein said threaded portion of said angled head is configured to accept a threaded bezel that will also screw onto a threaded portion of said battery housing, thereby retaining a light source assembly in a position that is electrically connectable with batteries in said battery housing.

60. A rotatable angled flashlight head, comprising
a body having a first end adapted for replaceable attachment to a flashlight battery housing, and a second end adapted for holding a light source assembly, wherein a central axis passing through said first end makes an angle of 90±30 degrees with a central axis passing though said second end;
electrical connections within said device configured to electrically connect batteries in said battery housing with a light source in said light source assembly; and
a glass breaker;
wherein said angled flashlight head is rotatable about the central axis through said first end when installed on a battery housing.

* * * * *